(12) United States Patent
Rydell

(10) Patent No.: US 6,634,135 B1
(45) Date of Patent: Oct. 21, 2003

(54) BIFURCATED DOUBLE HOOK SOFT BODIED FISHING LURE

(75) Inventor: Theodore Rydell, Pound, WI (US)

(73) Assignee: Theodore Bruce Rydell, Pound, WI (US)

( * ) Notice: Subject to any disclaimer, the term of this patent is extended or adjusted under 35 U.S.C. 154(b) by 381 days.

(21) Appl. No.: 09/263,532

(22) Filed: Mar. 5, 1999

(51) Int. Cl.⁷ ............................................... A01K 85/00
(52) U.S. Cl. ...................... 43/42.1; 43/42.24; 43/42.29; 43/44.8; 43/44.82
(58) Field of Search ............................. 43/42.28, 42.29, 43/42.24, 42.26, 42.3, 42.11, 44.8, 44.82

(56) References Cited

U.S. PATENT DOCUMENTS

| | | | | |
|---|---|---|---|---|
| 2,317,900 A | * | 4/1943 | Freeman | 43/44.82 |
| 2,534,469 A | * | 12/1950 | Moore | 43/44.82 |
| 3,400,483 A | * | 9/1968 | Temple | 43/44.8 |
| 3,435,553 A | * | 4/1969 | Conley | 43/44.8 |
| 3,600,838 A | * | 8/1971 | Bablick | 43/44.8 |
| 3,748,773 A | * | 7/1973 | Goforth | 43/42.1 |
| 3,834,060 A | * | 9/1974 | Wagenknecht | 43/44.8 |
| 3,879,886 A | * | 4/1975 | Thomas | 43/44.6 |
| 4,506,470 A | * | 3/1985 | Adams | 43/44.8 |
| 4,625,451 A | * | 12/1986 | Griffiths | 43/44.4 |
| 4,750,290 A | * | 6/1988 | Renaud | 43/42.29 |
| 4,937,966 A | * | 7/1990 | McKenzie | 43/44.8 |
| 5,009,026 A | * | 4/1991 | Corbitt | 43/44.8 |
| 5,388,367 A | | 2/1995 | Rydell | 43/43.2 |

* cited by examiner

Primary Examiner—Kurt Rowan

(57) ABSTRACT

The invention provides a soft bodied bifurcated frog-like lure. The lure is created by spreading the individual hooks of a double hook apart and threading soft bodied plastic baits over the points of the hooks and onto the shanks of the hooks. When the hooks are allowed to spring back together the parts of the soft bodied plastic baits that are threaded on the hook shanks are compressed between the shanks of the two hooks and locked in place. The baits can be replaced by reversing the procedure to remove the old baits and then threading the new baits onto the shanks of the hooks. The addition of weed guards to the hooks adds to the frog-like shape of the lure.

2 Claims, 2 Drawing Sheets

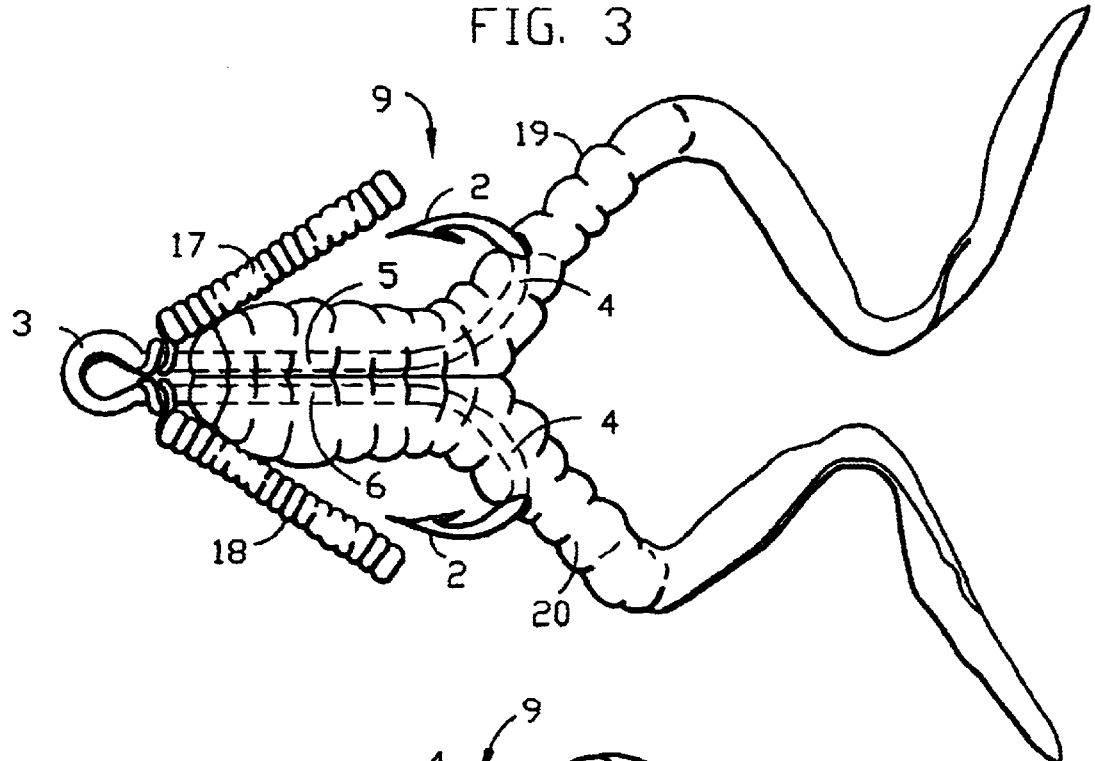
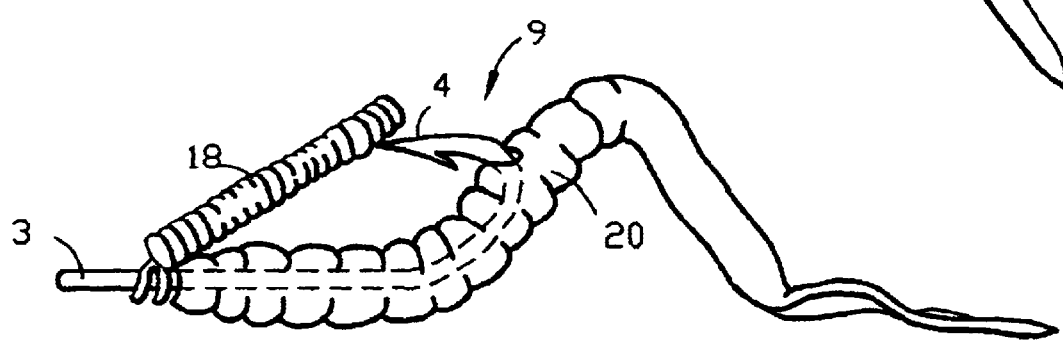

BIFURCATED DOUBLE HOOK SOFT BODIED FISHING LURE

FIELD

This invention relates to fishing lures wherein a soft bodied plastic fishing bait is secured on a hook.

More specifically, this invention relates to fishing lures wherein multiple soft bodied plastic fishing baits are secured on multiple hooks formed of a single wire.

Still more specifically, this invention relates to a novel combination of the most desirable attributes of soft bodied fishing baits, multiple hook clusters and guarded hooks, while diminishing some less desirable attributes of these elements.

BACKGROUND

Plastic soft bodied artificial baits that have a look and texture similar to the live bait that they are molded to look like have added a new dimension to fishing. The addition of scents to the plastics and use of colors not found in natural bait has enhanced the effectiveness of these baits in attracting fish.

Heretofore these baits have suffered from deficiencies that are found in their live bait counterparts. They have a tendency to slide along the shank of a hook to which they are attached. They are subject to tearing and breakage when dragged through cover or against weeds and brush. They are readily damaged and diminished by the strike of a fish. As a result of these deficiencies, fishing with soft bodied plastic baits is often as expensive as fishing with live bait.

Soft bodied lures that simulate polywogs and frogs are effective in fishing in or near weed beds and brush.

The ubiquitous plastic worm is an example of a soft bodied bait suitable for use in this invention.

Guard hooks such as those taught by the inventor in his U.S. Pat. No. 5,388,367 are suitable for use in this invention.

BRIEF DESCRIPTION OF THE INVENTION

A double hook formed of a single length of wire is combined with two soft bodied plastic baits threaded onto the shanks of the double hook so that the portion of the baits between the shanks of the double hooks are resiliently pressed against each other and thereby held in place on the hook. Resilient weed guards secured to the shanks of the double hook near the eye of the double hook and extending to near the locations of the hook points of the double hook serve to protect the soft bodied baits threaded along the shanks of the hooks from damage during passage through cover and when struck by a fish.

BRIEF DESCRIPTOR OF THE DRAWINGS

FIG. 3 is a plan view of a preferred embodiment of the invention.

FIG. 4 is an elevational view of the embodiment of FIG. 2.

DETAILED DESCRIPTION OF THE INVENTION

Figure 1:
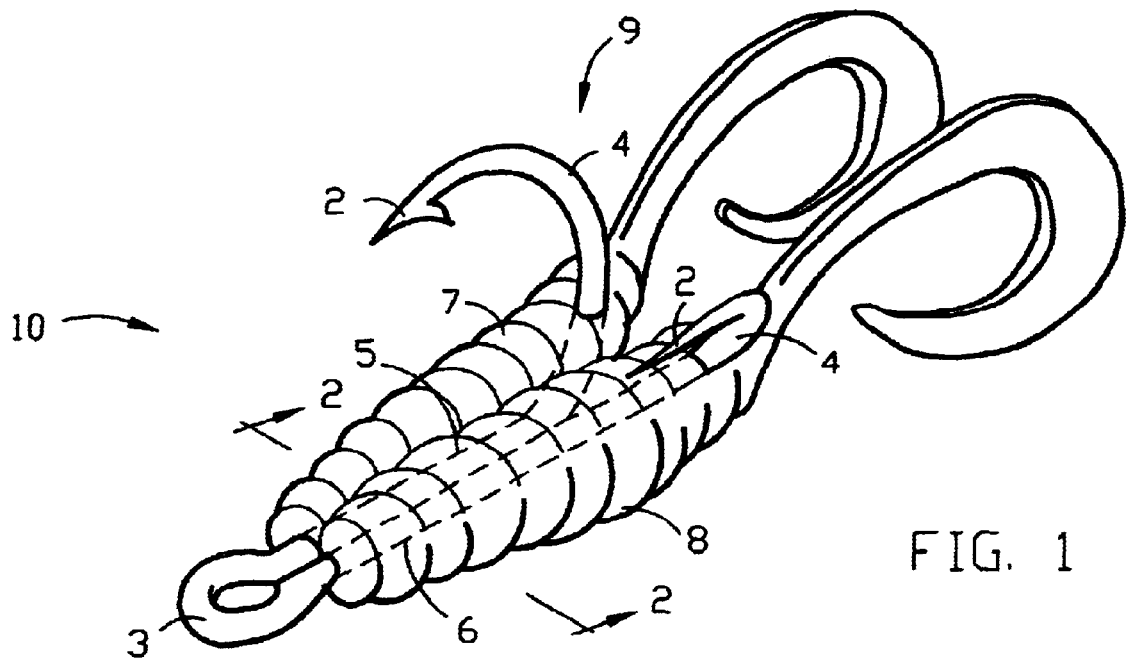
FIG. 1 is a pictorial view of the invention in its simplest form.

In the drawings like numbers refer to like objects and the proportions of some elements have been modified to facilitate illustration.

Figure 2:
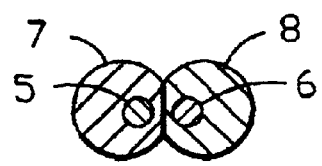
FIG. 2 is an elevational cross sectional view along section line 2—2 of FIG. 1

Referring now to FIGS. 1 and 2 wherein soft bodied fishing lure 10 comprises double hook 9, and first soft bodied plastic bait 8 and second soft bodied plastic bait 7.

Heretofore, it has not been deemed feasible to thread live baits such as minnows, leeches, or worms onto the shanks of cluster hooks such as double and treble hooks. In view of the closeness of the physical properties of soft bodied plastic baits to those of live bait, the art has reasonably assumed that soft bodied plastic baits can not be practically threaded onto the shanks of cluster hooks. Contrary to prior art teachings and common knowledge, the inventor has discovered that soft bodied plastic baits can be threaded onto the shank of a single hook of a double hook cluster by springing the hooks apart while threading a soft bodied plastic bait onto one of the parallel hook shanks. A second soft bodied plastic bait can be threaded onto a second parallel shank of the double hook. When the parallel shanks of the double hook are allowed to spring back together, the portions of the soft bodied plastic baits that are threaded along the parallel shanks of the double hook are pressed against each other with a considerable amount of pressure. The bifurcated lure that is created by the methods described above has the general configuration of a frog. The bifurcated nature of the lure permits the removal and replacement of one or both of the soft bodied baits.

Double hooks 9 that are suitable for forming lure 10 are formed of a single length of wire which has an eye 3 formed in the middle of the wire and having two parallel hook shanks extending from eye 3, each hook shank terminating in a semicircular bend 4 and having a hook point 2 formed at each end of the length of wire. The semicircular bends 4 are angled to each other so that the hook points 2 are spaced apart from each other. The resilience of the wire resiliently biases the parallel shanks towards each other.

As shown in FIG. 2 when first parallel shank 6 and second parallel shank 5 are allowed to spring back together while having first soft bodied plastic bait 8 and second soft bodied plastic bait 7 threaded thereon respectively, baits 7 and 8 are resiliently deformed. The clamping action of first parallel shank 6 and second parallel shank 5 compresses first soft bodied plastic bait 8 and second soft bodied plastic bait 7 so as to frictionally engage them with each other and resist their sliding down the shanks of their respective hooks. The fact that semicircular bends 4 are angled to each other further resists the tendency of soft bodied baits to slide down the shanks of hooks. This clamping and positional hold affords the soft body of lure 10 a degree of resistance to the ripping and tearing tendencies that are common with soft bodied lures. The addition of resilient weed guards to double hook 9 further serves to protect soft bodied fishing lure 10 from damage.

Referring now to FIGS. 3 and 4 wherein a preferred embodiment of the lure of this invention is shown. Double hook 9 is hereshown to have threaded thereon first plastic worm bait 20 and second plastic worm bait 19 to form a frog-like lure. The frog like geometry is enhanced by the attachment to double hook 9 of first resilient weed guard 18 to first parallel shank 6 near eye 3 and of second resilient weed guard 17 to second parallel shank 5 near eye 3, and guards 17 and 18 extend to near hook points 2 as shown in FIGS. 3 and 4. Resilient weed guards 17 and 18 are hereshown as being formed from coil springs which further enhance the frog-like appearance of the soft bodied fishing lure of FIGS. 3 and 4 and provides additional protection to the portions of baits 19 and 20 that are threaded onto parallel shanks 5 and 6.

The above disclosures represent the best mode of practicing the invention known to the inventor and would enable one skilled in the art to make and use the invention without undue experimentation.

It would be readily recognized by those skilled in the art that a large part of the total population of soft bodied plastic baits would be the functional equivalents of the soft bodied plastic baits disclosed and illustrated herein. It would further be recognized by those skilled in the art that a large portion of the total population of weed guards would be the functional equivalents of the weed guards disclosed and illustrated herein. Therefore, it should be understood that the scope of this invention should not be limited to the embodiments disclosed but that the scope of this invention should only be limited by the scope of the appended claims and all equivalents thereto that would be made apparent to one skilled in the art.

I claim:

1. A soft bodied fishing lure comprising;
   a) a double hook formed of a single length of wire and having an eye formed in the middle of the length of wire, two parallel hook shanks extending from the eye, each shank terminating in a semicircular bend and having a hook point formed at each end of the wire, and the semicircular bends are at an angle to each other so that the hook points are spaced apart from each other and the parallel shanks are resiliently biased towards each other,
   b) a first soft bodied plastic bait partially threaded onto a first parallel shank of the double hook and the bait is clamped in place along the first parallel shank by a second parallel shank of the double hook and a second soft bodied plastic bait partially threaded onto said second parallel shank of the double hook and the second soft bodied bait is clamped in place along the second parallel shank by said first parallel shank.

2. A soft bodied fishing lure comprising;
   a) a double hook formed of a single length of wire and having an eye formed in the middle of the length of wire, two parallel hook shanks extending from the eye, each shank terminating in a semicircular bend and having a hook point formed at each end of the wire, and the semicircular bends are at an angle to each other so that the hook points are spaced apart from each other and the parallel shanks are resiliently biased towards each other,
   b) a first soft bodied plastic bait partially threaded onto a first parallel shank of the double hook and the bait is clamped in place along the first shank by a second parallel shank of the double hook and a second soft bodied plastic bait partially threaded onto said second parallel shank of the double hook and the bait is clamped in place along the second parallel shank by said first parallel shank, and
   c) a first resilient weed guard secured to said first parallel shank of the double hook near said eye and extending to near the hook point formed on the end of the wire on that side of the eye and a second resilient weed guard secured to said second parallel shank of the double hook near said eye and extending to near the hook point formed on the end of the wire on that side of the eye.

* * * * *